May 15, 1923.
J. J. HANRAHAN
LUGGAGE CARRIER
Filed Sept. 23, 1921
1,455,023
2 Sheets-Sheet 1
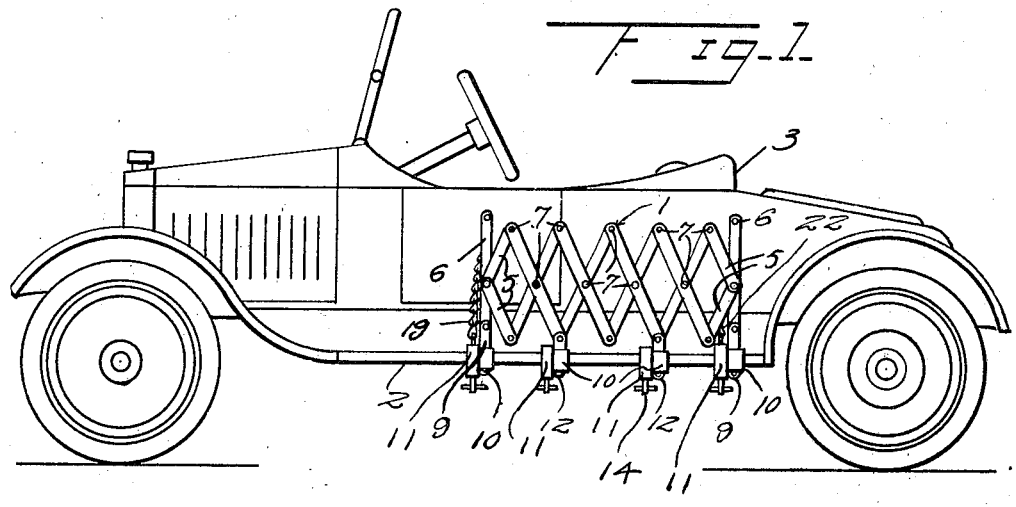
Fig. 1.
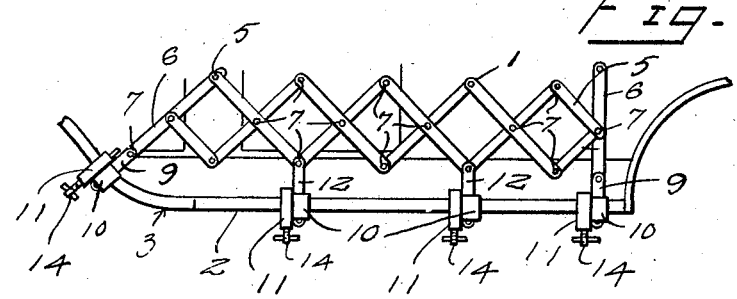
Fig. 2.
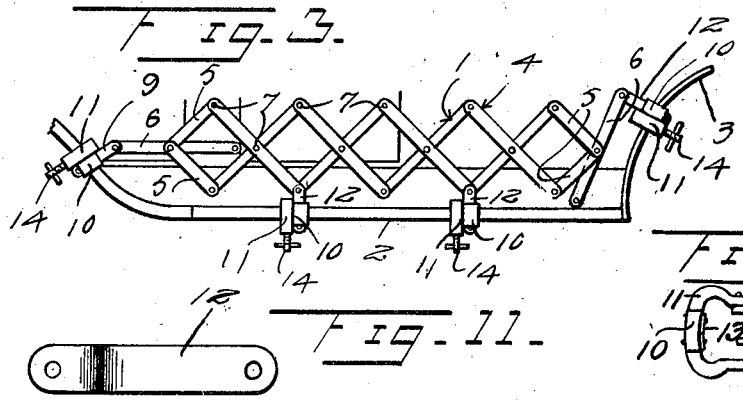
Fig. 3.
Fig. 11.
Fig. 10.
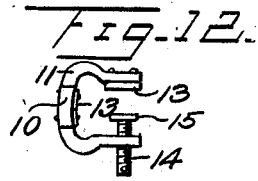
Fig. 12.
Inventor
J. J. Hanrahan
By
Attorney May 15, 1923.   J. J. HANRAHAN   1,455,023
LUGGAGE CARRIER
Filed Sept. 23, 1921   2 Sheets-Sheet 2
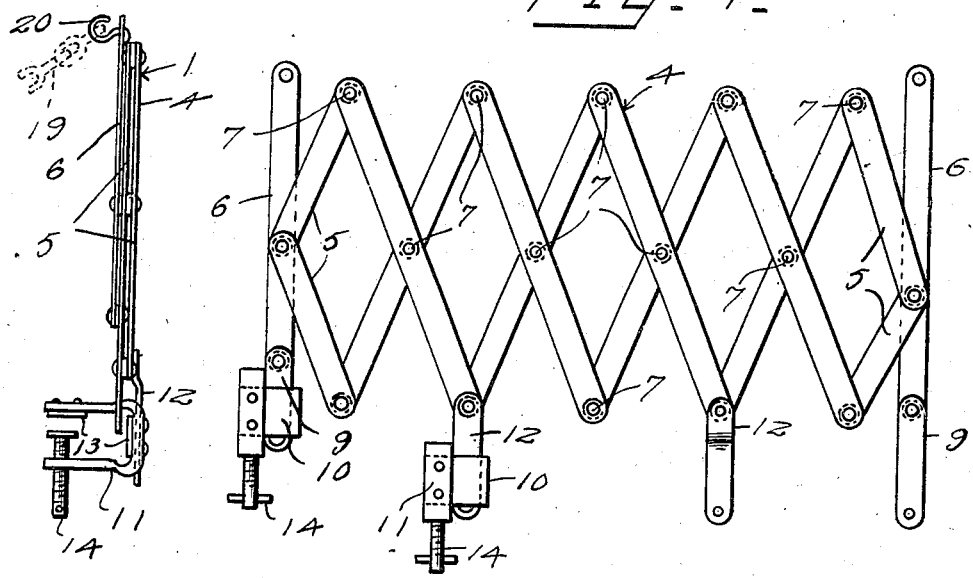
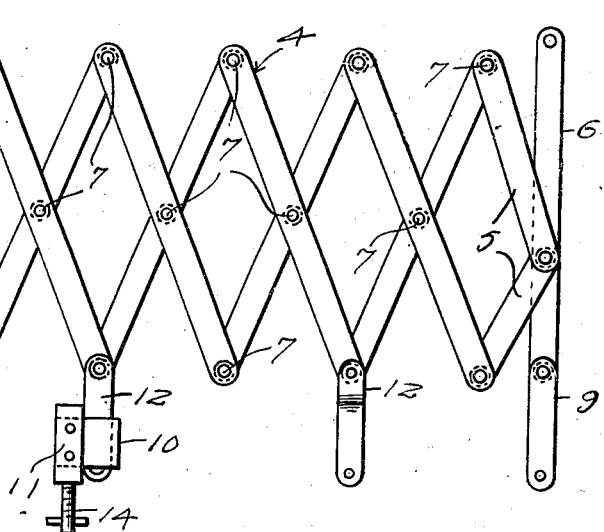
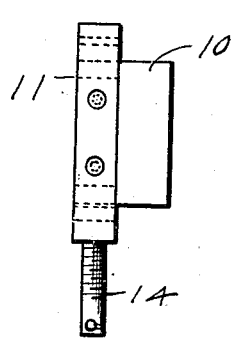
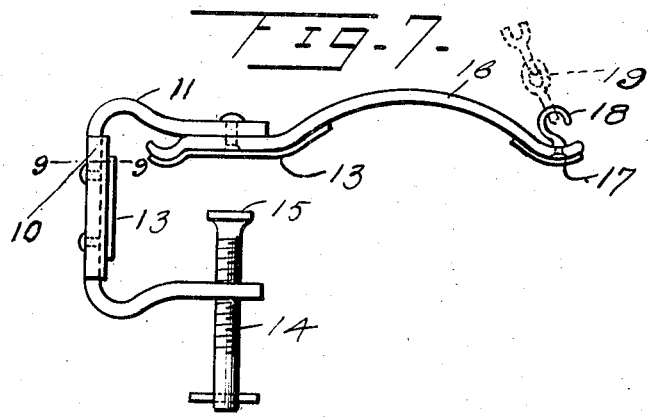
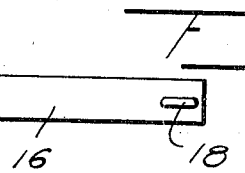
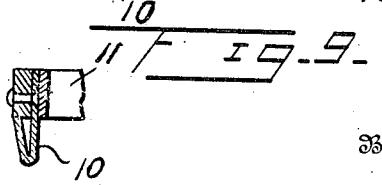
Inventor
J. J. Hanrahan Patented May 15, 1923.

1,455,023

UNITED STATES PATENT OFFICE.

JOHN J. HANRAHAN, OF NIAGARA FALLS, NEW YORK.

LUGGAGE CARRIER.

Application filed September 23, 1921. Serial No. 502,651.

*To all whom it may concern:*

Be it known that I, JOHN J. HANRAHAN, a citizen of the United States, residing at Niagara Falls, in the county of Niagara and State of New York, have invented certain new and useful Improvements in Luggage Carriers; and I do hereby declare the following to be a full, clear, and exact description of the invention, such as will enable others skilled in the art to which it appertains to make and use the same.

This invention relates to new and useful improvements in carriers or racks for carrying trunks, luggage or parcels on automobiles and has for its primary object the provision of means which will be easily and quickly applicable to the running board and also to the mud guards of an automobile if desired to retain trunks and other luggage on the running board and thereby leave the interior of the automobile free for use by persons and allow them to ride with comfort on long trips or when touring.

Another object of this invention is the provision of means whereby the device may be adjusted as to length, thereby varying the capacity of the device and the amount of room consumed on the running board.

A further object of this invention is the provision of a luggage carrier of the above stated character which will be simple, durable, and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a side elevation illustrating a carrier constructed in accordance with my invention applied to the running board of an automobile, Figure 2 is a similar view illustrating the carrier in a partly extended position, Figure 3 is a similar view illustrating the carrier in a fully extended position, Figure 4 is a front elevation illustrating the carrier with one end and one intermediate clamp in position, Figure 5 is an end elevation illustrating the carrier with one intermediate clamp in position, Figure 6 is an enlarged top plan view illustrating an end clamp, Figure 7 is a side view illustrating the same, Figure 8 is a front view illustrating the same, Figure 9 is a sectional view taken on the line 9—9 of Figure 7, Figure 10 is an edge view illustrating one of the offset short links, Figure 11 is a side view illustrating the same.

Figure 12 is a side elevation illustrating one of the running board clamps.

Referring in detail to the drawings the numeral 1 indicates a rack or carrier applied to the running board 2 of an automobile 3 and includes a lazy tongs structure 4, the ends of which are pivoted to half links 5 that are pivoted to attaching members 6 and to each other. The links constituting the main portion of the lazy tongs are connected by rivets 7 and having washers thereon and which are located between the links to permit said links to work freely during the lengthening and shortening of the device.

The attaching members 6 are pivoted to the ends or half links so that their upper portions will be longer than their lower portions and in the present instance they are shown so that the upper portions are longer than the half links 5 and the lower portions shorter than said half links. Straight links 9 are pivoted to the lower ends of the attaching members 6 and are slidably received by brackets 10 that form part of clamps 11 which engage the outer edge of the running board. Short links 12 are pivoted to some of the members or links constituting the lazy tongs and are slidably received by brackets 10 of other clamps 11 which are also applied to the running board. The links 12 are offset to position the lazy tongs over the running board and to provide stops to engage the brackets of the respective clamps and thereby limit the movement of said links downwardly in the brackets. The clamps are substantially U-shape and straddle the outer edge of the running board and are provided with pads 13 to prevent marring of the automobile. Thumb screws 14 are carried by the clamps and are adapted to be turned against the running board and one of their ends are provided with pads 15. The end clamps have secured thereto curved arms 16, the end portions thereof having pads 17 to engage the mud guards when said clamps are applied thereto. Hooks 18 are provided at the ends of the curved arms and have attached thereto chains 19 which are fastened to hooks 20 on the upper ends of the attaching members 6 to prevent the lazy tongs from bulging outwardly when under weight of luggage and also prevent the luggage from falling out of the ends of the carrier. The arms 16 are curved to conform to the contour of curved mud guards when the clamps are applied thereto as shown in Figures 2 and 3. The essential difference between the end clamps and the intermediate clamp resides in the arms 16 carrying the hooks 18 and pads 17, this structure being employed with the end clamp. In the construction of the intermediate clamp the pads 13 carried by the inner ends of the arm 16 in the end clamp, are attached to the clamp per se, this being clearly shown in Figure 12 of the drawings. A comparison of Figures 7 and 12 will make clear the differences above mentioned.

It will be noted that in Figure 1, links 12 are as far down as they will go in the clamps 11 and on account of the lazy tongs being in a shortened position, the end links are raised somewhat from the clamps, and as the rack is extended it becomes shorter vertically and the end links are correspondingly dropped into the clamps, or the fixing of an end clamp as in Figure 2 will automatically adjust the links for height in the end clamps, while the adjustments longitudinally of the rack will fix the positions of the clamps along the running board. The weight of the rack will hold it in place in the clamps together with the friction of the links in said clamps without the end chains. When mounted, as in Figure 1, and without the chains, the rack is readily detachable by simply lifting it from the clamps, however, when mounted as shown in Figures 2 and 3, the fastening of one of the end clamps on the front mud guard locks all of the links in their clamps and the rack can only be removed by loosening said end clamp on the mud guard to allow a slight shifting of the clamp when the rack is raised to detach it.

The rack can also be clamped to the rear mud guard instead of the front one, or to both of them when convenient as shown in Figure 3.

While I have shown and described the preferred embodiment of my invention, it will be understood that minor changes in construction, combination, and arrangement of parts may be made without departing from the spirit and scope of the invention as claimed.

Having thus described my invention what I claim is:—

1. A luggage carrier comprising a lazy tongs body, pivoted to a single member at each end, supporting links pivoted to said end members and to said body and clamps adapted to support said body by means of said pivoted links.

2. A luggage carrier comprising a longitudinally extensible body having pivoted end members, supporting links pivoted to said body and clamps adapted to support said body by means of said links.

3. A luggage carrier comprising a horizontally extensible lazy tongs body, pivotally connected to a vertically disposed member at each end, links pivoted to the lower end of said end members and to the said body and clamps having eye pieces adapted to receive said links and support said body.

4. A luggage carrier comprising a lazy tongs body having half length members at each end which are pivoted to single end members having one end shorter than said half length members to which are pivoted supporting links and clamps adapted to receive said links and support said body.

5. A luggage carrier comprising a lazy tongs body having half length end members which are pivoted to single supporting end members having pivoted links, links pivoted to said body, end and intermediate clamps adapted to receive said links and support said end members and said body, said end clamps having long top members, and means to connect the top of said single end members with the long end clamp members.

6. In combination with an automobile running board, a luggage carrier comprising a lazy tongs body pivotally connected to a vertically disposed member at each end, links pivoted to the lower end of said end members, end clamps adapted to extend across the top of said running board and chains to connect the upper end of said end members and the extended top of said clamps.

7. A luggage rack for the running board of an automobile including a lazy tongs body, end members pivoted to the body, links pivoted to the lower ends of said members and to some of the elements of the lazy tongs body, clamps having eyes receiving the links and secured to the running board, arms having hook-shaped ends secured to some of said clamps and extending at right angles to the body, and flexible elements secured to the upper ends of the end members and to the hook-shaped ends of the arms to prevent bulging of the body and to aid in holding the links in the eyes.

8. In combination with an automobile running board, a lazy tongs body extending longitudinally of the running board and inwardly of the outer edge of the latter, clamps secured to the running board and having eyes and links pivoted to the body and received by the eyes, some of said links being offset to limit their movement into the eyes and to permit positioning of the body inwardly of the outer edge of the running board.

9. In combination with an automobile running board, a lazy tongs body, members pivoted to the body, clamps carried by the running board, means detachably and pivotally connecting the end members and some of the elements of the body to the clamps, arms secured to some of the clamps and extending transversely of the running board, means between the end members and the arms to cooperate with the body in retaining luggage on the running board and to prevent accidental detachment of the body from the running board.

10. In combination with an automobile running board, a lazy-tongs body, and members each having a single pivotal connection to the body, clamps carried by the running board, means detachably and pivotally connecting the end members and some of the elements of the body to the clamps, and curved arms secured to some of said clamps and extending transversely of and each engaging the running board with their medial portions spaced from the running board to provide stops for luggage, and means connecting the end members to the arms.

11. A luggage carrier comprising a longitudinally extensible body, supporting links pivoted to the lower end of said body, said links having an offset portion, and clamps having eye pieces adapted to receive the links and support said body, said offset portion limiting the movement of the links into said eyes.

In testimony whereof I affix my signature in presence of two witnesses.

JOHN J. HANRAHAN.

Witnesses:
 EDWARD M. FLYN,
 GEORGE R. CRITTSINGER.